UNITED STATES PATENT OFFICE.

VICTOR W. PAGÉ, OF NEW YORK, N. Y.

FUEL TANK.

1,419,896.   Specification of Letters Patent.   Patented June 13, 1922.

Application filed April 22, 1921. Serial No. 463,735.

*To all whom it may concern:*

Be it known that I, VICTOR W. PAGÉ, a citizen of the United States, and a resident of the city of New York, Kew Gardens, borough of Queens, in the county of Queens and State of New York, have invented a new and Improved Fuel Tank, of which the following is a full, clear, and exact description.

The present invention relates to new and useful improvements in vehicle bodies and it pertains more particularly to a fuel tank construction therefor.

It is one of the primary objects of the invention to construct a fuel tank compartment in such a manner that an overflowing of the fuel contained therein owing either to a leak in the tank or to carelessness in the filling thereof, will be conveyed to a point exterior of the vehicle body.

It is a further object of the invention to construct a fuel tank compartment in such a manner that the same is readily accessible for the purpose of filling.

It is a still further object of the invention to so construct a fuel tank compartment that the same has no communication with the passenger compartment of the body.

With the above and other objects in view, reference is had to the accompanying drawings, in which—

Figure 1:
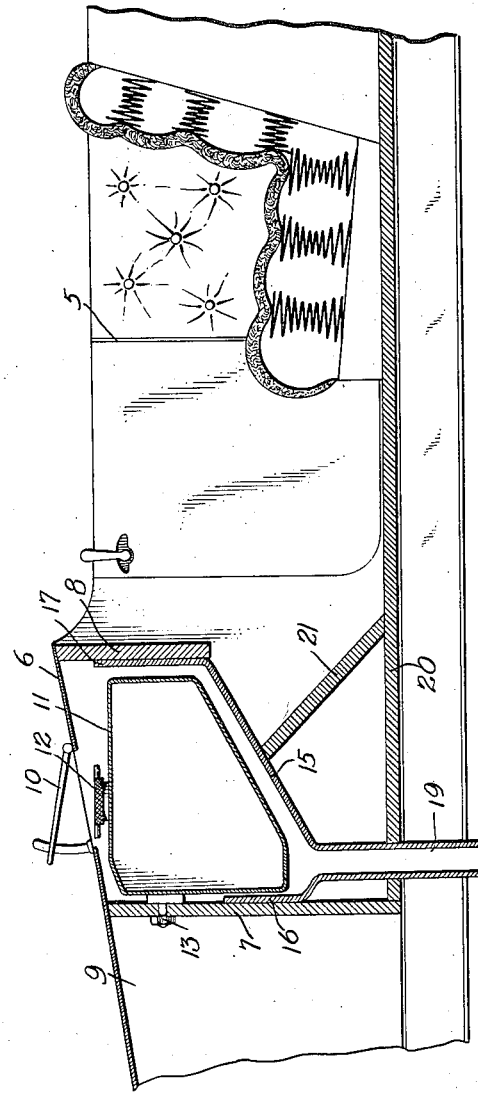
Figure 1 is a longitudinal sectional view partly broken away of a motor vehicle body showing the construction of the fuel tank compartment.

Referring more particularly to the drawings the reference character 5 designates the body, and 6 designates the cowl section thereof. This cowl section is divided into a fuel tank compartment by a front partition 7 and a rear partition 8. The front partition extends throughout the height of the body and separates the tank compartment from the engine compartment 9. The cowl 6 is provided with a hinge closure 10 adapted to form the means for permitting access to the tank compartment to fill the tank in a manner to be hereinafter described.

The reference character 11 designates the fuel tank, and 12 designates the filling opening thereof. This tank is preferably supported from the forward partition 7 of the tank compartment by suitable supporting means 13. Surrounding the tank 11 is an apron or the like 15, said apron being secured to the front partition 7, as at 16, and to the rear partition 8, as at 17. This apron has its walls inclined and leading to a discharge 19 in the form of a pipe extending through the floor 20 of the body. The reference character 21 designates a floor board which is angularly disposed with respect to the apron 15, tank compartment, and floor of the body 5.

When it is desired to fill the tank, the hinge closure 10 is opened and the cap removed from the filling opening thereof. If upon filling the tank 11, the fuel should overflow or splash upon the tank 11, it is apparent that as the same drains from the tank, it will be picked up by the apron and conveyed to a point where it will be discharged from the body 6, thereby preventing its entering the passenger compartment, or the accumulation of fuel at any point in the car. It is also true that should the tank 11, through any cause, spring a leak, the leakage would be conveyed by means of the apron 15 to the pipe 19 which would serve to discharge it from the car.

Figure 2:
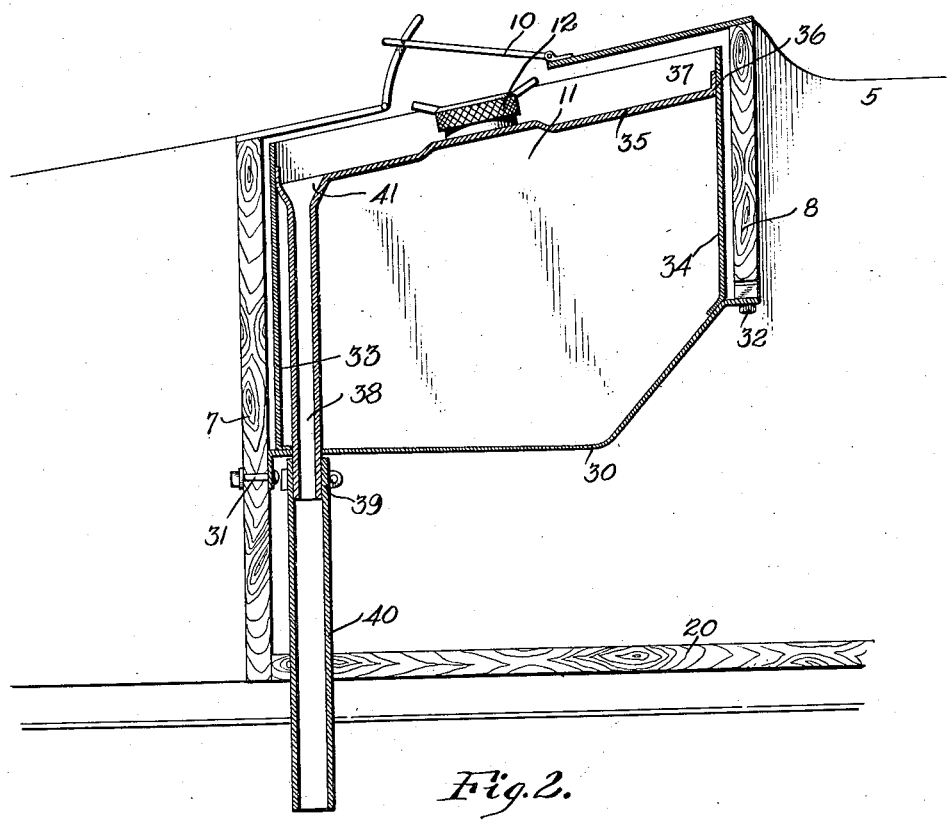
Fig. 2 is a similar view of a slightly modified form of the invention.

In Fig. 2 is shown a slightly modified form of the invention, and in this form the bottom wall 30 of the tank is secured to the forward partition 7, as at 31, and to the rear partition 8, as at 32.

The reference characters 33 and 34 designate the front and rear walls, respectively, of the tank, and said front and rear walls extend upwardly as shown. The top wall 35 of the tank is secured to the side walls as at 36, at a point below their upper edge, which construction provides an upstanding flange 37 defining the top of the tank 11. The top wall 35 is formed with a depending pipe or the like 38 which extends through the tank 11 and secured to the lower end thereof, as at 39, is a discharge pipe 40, leading through the floor 20 of the vehicle body. This pipe 38 extends through the tank 11 and has its upper end open to the space defined by the upstanding flange 37, as indicated at 41, at the lowest point of the top wall 35, it being understood that the top wall 35 is inclined, preferably forwardly of the tank compartment. By this construction, any leakage or splash due to filling or a faulty closure, will be conveyed from the top wall 35 by means of the pipe 38, to the extension 40, where it will be discharged from the car.

From the foregoing it is apparent that the present invention provides a new and novel form of tank compartment construction, by means of which leakage and splash of the fuel tank is prevented from entering the passenger compartment of the car, or the accumulation of inflammable fuel at any point about the car.

I claim:

1. In combination with the fuel tank of a vehicle, means for collecting the overflow of said tank and conveying the same to a point exterior of the vehicle.

2. In combination with a motor vehicle and its fuel tank, means associated with said fuel tank and adapted to collect and convey the overflow thereof to a point removed from the motor vehicle and its fuel tank.

3. In a fuel tank, a top wall positioned at a point below the upper edge of the side walls of the tank to provide an upstanding flange defining the top wall of the tank, and means for conveying liquid accumulations from said top wall, said means extending through the tank and the bottom wall thereof, substantially as described.

VICTOR W. PAGÉ.